July 8, 1941.  B. DICK  2,248,747
INTERLOCKING MECHANISM
Filed Jan. 29, 1940
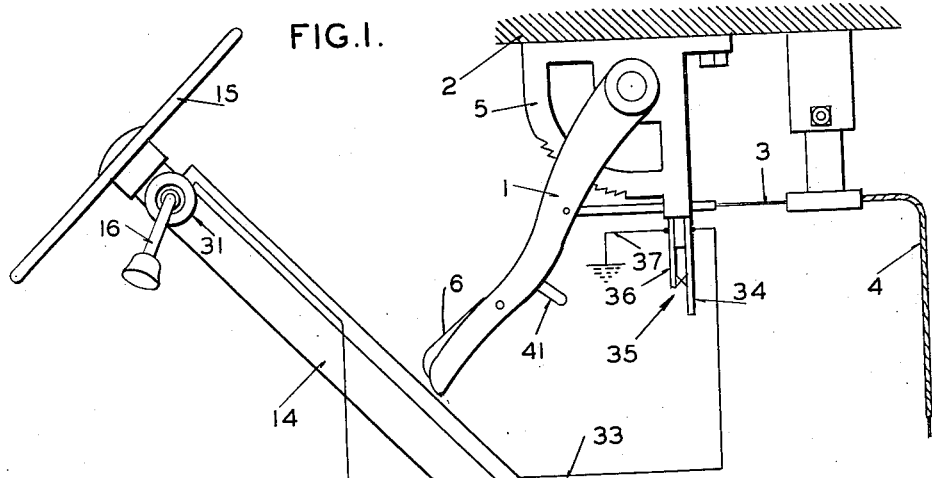
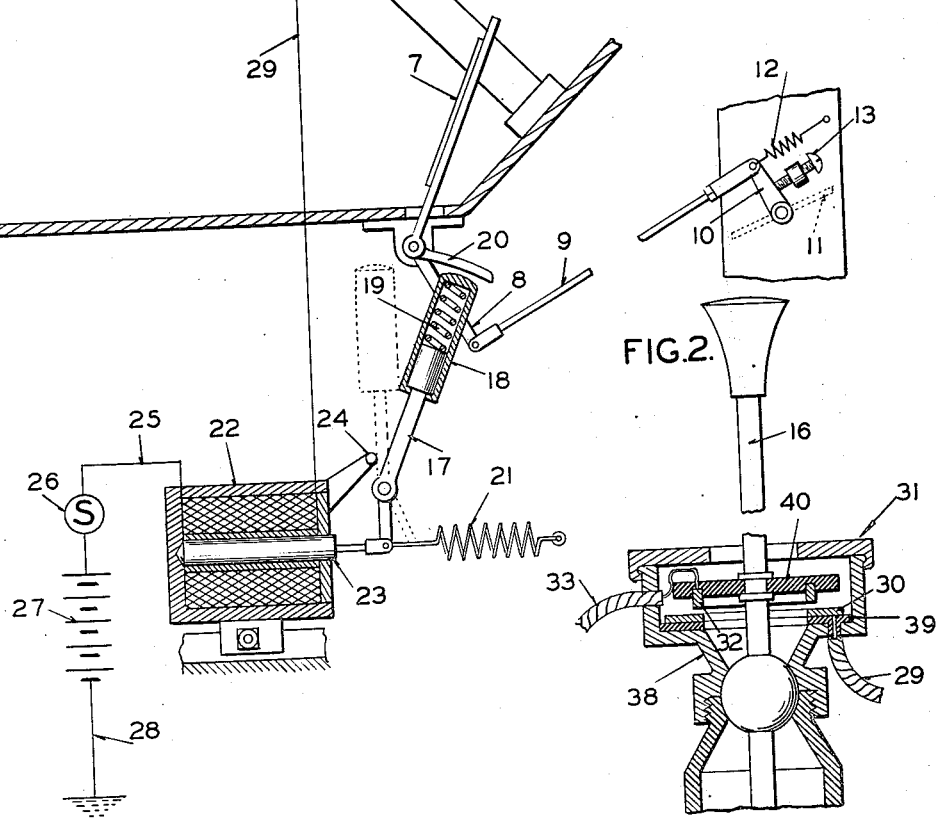
INVENTOR
BURNS DICK
BY
ATTORNEY Patented July 8, 1941

2,248,747

UNITED STATES PATENT OFFICE 2,248,747

INTERLOCKING MECHANISM

Burns Dick, Ferguson, Mo., assignor to Wagner Electric Corporation, St. Louis, Mo., a corporation of Delaware Application January 29, 1940, Serial No. 316,112

9 Claims. (Cl. 192—3)

My invention relates to interlocking mechanism and more particularly to such a mechanism for use with a parking brake control mechanism and an accelerator mechanism of a motor vehicle. The invention is an improvement in the interlocking mechanism disclosed in my copending application Serial No. 291,852, filed August 25, 1939, for Parking brake and accelerator interlock.

One of the objects of my invention is to provide means for disabling, under certain conditions, an interlocking mechanism for an accelerator mechanism and a parking brake control mechanism.

Another object of my invention is to provide an improved interlocking mechanism of the kind referred to which will be effective to prevent normal operation of the accelerator mechanism when the parking brake control mechanism is not fully released and then only when the change speed gearing is in an operative position.

Other objects of my invention will become apparent from the following description taken in connection with the accompanying drawing in which Figure 1 is a schematic view of an accelerator mechanism and a parking brake control mechanism having associated therewith an interlocking mechanism embodying my invention; and Figure 2 is a cross-sectional view of the control switch associated with the gear shifting lever.

Referring to the drawing in detail, 1 indicates a hand lever for controlling the parking brake of the vehicle. This hand lever is shown as pivoted on the underside of the instrument panel 2 and connected to a cable 3 which extends through a flexible sheath 4 to actuate the brake mechanism (not shown). The lever has associated therewith a tooth sector 5 which co-operates with a detent (not shown) carried by the lever, whereby the lever may be held in different operative positions, the detent being controlled by a hand operated element 6.

Also shown in Figure 1, an accelerator pedal 7 is pivotally mounted on the floor board of the vehicle and extends into the operator's compartment for operation by the foot of the operator. This pedal carries an arm 8 which is connected by a rod 9 with the arm 10 of the throttle valve 11. A spring 12 biases the throttle valve and accelerator mechanism to its normal idling position which is determined by the stop 13 cooperating with the arm 10.

Also shown in Figure 1 is the steering column 14 of the vehicle which is positioned in the operator's compartment. The upper end of this column carries the steering wheel 15 and mounted below this steering wheel is the gear shifting lever 16 for controlling by suitable connections the shifting of the change speed gearing (not shown).

In accordance with my invention there is pivotally mounted adjacent the accelerator pedal an arm 17 which has telescopically mounted on its end a plunger 18 held in an extended position by the spring 19. The end of this plunger is adapted to co-operate with a short arm 20 fixed to the accelerator in order to prevent normal operation of the accelerator mechanism under certain conditions. As seen from the drawing the arm and plunger are capable of assuming a position out of the path of movement of arm 20 to thereby permit the accelerator mechanism to be operated in a normal manner. A spring 21 is connected to the arm 17 in order to normally swing the arm and plunger to its position out of the path of movement of arm 20 on the accelerator pedal. In order that the arm and plunger may be swung to an operative position where it will lie in the path of the arm 20 there is provided a solenoid 22 having an armature 23 connected to the arm 17. Thus when the solenoid is energized, the arm will be swung to its operative position. The solenoid which is fixed to a suitable support is shown as carrying a stop 24 to determine the inoperative position of the arm when controlled by the spring 21.

One end of the winding of the solenoid is connected by conductor 25 through the ignition switch 26 of the vehicle to one terminal of a battery 27, the other terminal being connected to the ground by a conductor 28. The other end of the winding of the solenoid is connected by a conductor 29 to the contact element 30 of a gear shift lever controlled switch 31. The other contact element 32 of this switch is connected by a conductor 33 to a contact element 34 of a switch 35 mounted adjacent the brake control lever 1. The second contact element 36 of this latter switch is connected by a conductor 37 to ground to thus complete the circuit.

The contact element 30 of the gear shift lever controlled switch 31 is in the form of an annular ring mounted on the casing 38 which supports the gear shift lever 16, there being suitable insulation material 39 between the contact element and the casing. The other contact element 32 of this switch is in the form of a ring carried on a disc 40 of insulating material secured to the gear shift lever. The contact elements are so related that when the gear shift lever is in its neutral position the switch will be open and when the gear shift lever is moved to any of its operative positions to place a speed ratio gear in operative condition the switch will be closed.

The contacting elements 34 and 36 of the switch 35 are in the form of leaf springs and the switch is so positioned that it will be opened only when the brake controlling lever 1 is in its full "off" position. To accomplish this one leaf spring forming the contact element 34 projects beyond the contact element 36 in order that it may be engaged by a projection 41 carried by the lever 1 when the lever moves to its full "off" position.

In operation when the gear shift lever is in its neutral position or when the brake control lever 1 is in its full "off" position the circuit will be open and the solenoid will not be energized thus permitting the spring 21 to be effective to place the arm in its inoperative position shown by the dotted lines. Under these conditions the accelerator mechanism may be operated in its normal manner. If the brake control lever is in an operative position and the vehicle is attempted to be driven by the placing of the gear shift lever in a shifted position then both switches will be in closed position. Under these conditions the solenoid will be energized and the arm 17 moved to the position shown in full lines where the yieldable plunger will be positioned in the path of the arm 20. Normal operation of the accelerator mechanism is now prevented since the spring 19 will cause considerable resistance to movement of the accelerator mchanism. Because of this the operator will be immediately informed that the parking brake is not released. When the brake lever is moved to full "off" position the switch 35 will be opened and the solenoid deenergized thus permitting the spring to move the arm and plunger to an inoperative position and allow normal operation of the accelerator mechanism.

There are times when it may be desirable to have the parking brake applied and yet at the same time have free use of the accelerator mechanism, such as when starting the engine with the vehicle standing still. Such operation is possible with the control mechanism shown since by placing the gear shift lever in neutral position the solenoid will be prevented from being energized and the plunger moved into the path of the arm 20.

From the foregoing description it is apparent I have produced an interlocking mechanism which will prevent normal operation of the accelerator mechanism in moving the vehicle whenever the parking brake lever is not fully released thus warning the operator of the applied condition of the parking brake. The interlocking mechanism however will be inoperative if the gear shift lever is in neutral thus permitting the operator to move the accelerator mechanism in a normal manner to start the engine or to warm it up while the vehicle is standing still. With the interlocking mechanism there is no possibility of the operator of the vehicle driving any distance with the parking brake not released since as soon as he places the gearing in an operative position with the parking brake applied the plunger 18 will be placed in a position to prevent normal operation of the accelerator mechanism thus warning the driver that he has not released the parking brake.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a gear shifting mechanism, a brake control mechanism, an operator-controlled accelerator mechanism, means governed by the brake control mechanism when in an operative position for preventing normal operation of the accelerator mechanism, and means operable by the gear shifting mechanism when in a neutral position for causing the last named means to be inoperative.

2. In apparatus of the class described, a gear shifting mechanism, a brake control mechanism, an operator-controlled accelerator mechanism, and means governed by the brake control mechanism when in other than "full" brake off position and by the gear shifting mechanism when in a gear-engaged position for preventing normal operation of the accelerator mechanism.

3. In apparatus of the class described, a gear shifting mechanism, a brake control mechanism, an accelerator mechanism, means for preventing normal operation of the accelerator mechanism, and means for causing said means to be operative only when the brake control mechanism is in an operative position and the gear shifting mechanism is in an engaged position.

4. In apparatus of the class described, a gear shifting mechanism, a brake control mechanism, an accelerator mechanism, means for preventing normal operation of the accelerator mechanism, a solenoid for moving said means to an operative position, an electrical circuit including two switches, means for causing one of the switches to be open when the brake control mechanism is in an inoperative position, and means for causing the other switch to be open when the gear shifting lever is in neutral position.

5. In apparatus of the class described, a gear ratio shifting mechanism, a brake control mechanism, an accelerator mechanism, means for preventing normal operation of the accelerator mechanism, a solenoid for moving said means to an operative position, an electrical circuit including two switches, means for causing one of said switches to be closed when the brake control mechanism is operative, and means for causing the other switch to be closed when the gear shifting mechanism is in a position causing a gear ratio to be operative.

6. In apparatus of the class described, a gear shift lever, a brake control mechanism, an accelerator mechanism, means for preventing normal operation of the accelerator mechanism, a solenoid for controlling said means and an electrical circuit for the solenoid and including two switches, one of said switches being normally closed and so associated with the brake control mechanism that it will be opened only when said mechanism is in full brake release position and said other switch comprising a fixed element adjacent the gear shift lever and a second contact element so mounted on the gear shift lever that the switch will be opened when the gear shift lever is in neutral position and closed when the gear shift lever is in a gear engaged position.

7. In apparatus of the class described, a gear shifting mechanism, a brake control mechanism, an operator-controlled accelerator mechanism, means governed by the brake control mechanism when in an operative position for preventing normal operation of the accelerator mechanism, and means operable by the gear shift mechanism for disabling said last named means notwithstanding the brake control mechanism is in an operative condition.

8. In control aparatus for a motor vehicle, a brake control mechanism, an operator-controlled accelerator mechanism, a third control mechanism employed in operating the vehicle and having different positions, means for preventing normal operation of the accelerator mechanism, and control means for said preventing means for causing it to be operative only when the brake control mechanism is in an operative position and the third control mechanism is in one of its positions, said control means causing the preventing means to be inoperative when the third control mechanism is in another position and notwithstanding the brake control means is operative.

9. In control apparatus for a motor vehicle, a brake control mechanism, an operator-controlled accelerator mechanism, a third control mechanism employed in operating the vehicle and having different positions, means for preventing normal operation of the accelerator mechanism, control means for said preventing means including a solenoid and an electrical circuit embodying two switches, means for closing one switch when the brake control mechanism is in an operative position only, and means for closing the other switch when the third control mechanism is in one of its different positions, said other switch being open when the third control mechanism is in another position.

BURNS DICK.